(12) United States Patent
Choi et al.

(10) Patent No.: US 7,706,441 B2
(45) Date of Patent: Apr. 27, 2010

(54) TRANSCODING APPARATUS AND METHOD, AND TARGET BIT ALLOCATION AND PICTURE COMPLEXITY ESTIMATION APPARATUS AND METHODS USED FOR THE SAME

(75) Inventors: Byung-sun Choi, Suwon-si (KR); Jun Xin, Quincy, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 733 days.

(21) Appl. No.: 10/608,411

(22) Filed: Jun. 30, 2003

(65) Prior Publication Data

US 2004/0156438 A1 Aug. 12, 2004

Related U.S. Application Data

(60) Provisional application No. 60/430,086, filed on Dec. 2, 2002.

(30) Foreign Application Priority Data

Feb. 10, 2003 (KR) ............ 10-2003-0008146

(51) Int. Cl.
*H04B 1/66* (2006.01)
(52) U.S. Cl. ............................................. 375/240.12
(58) Field of Classification Search ............ 375/240.12, 375/240.02, 240.05, 240.25, 240.08, 240.13, 375/240.14, 240.15; 348/384; 382/251; *H04B 1/66; H04N 7/12*
See application file for complete search history.

(56) References Cited

U.S. PATENT DOCUMENTS

| | | | | |
|---|---|---|---|---|
| 5,598,213 A * | 1/1997 | Chung et al. ........... | 375/240.04 |
| 5,907,374 A * | 5/1999 | Liu ........................ | 375/240.26 |
| 6,167,084 A * | 12/2000 | Wang et al. ............. | 375/240.02 |
| 6,173,012 B1 * | 1/2001 | Katta et al. ............. | 375/240.15 |
| 6,181,742 B1 * | 1/2001 | Rajagopalan et al. ....... | 375/240 |
| 6,731,685 B1 * | 5/2004 | Liu et al. ................ | 375/240.14 |
| 6,915,018 B2 * | 7/2005 | Tajime ........................ | 382/251 |
| 7,075,984 B2 * | 7/2006 | Sato ...................... | 375/240.05 |
| 7,266,148 B2 | 9/2007 | Kim | |
| 2002/0126752 A1 * | 9/2002 | Kim ...................... | 375/240.03 |
| 2007/0297507 A1 | 12/2007 | Kim | |

FOREIGN PATENT DOCUMENTS

KR 2003-0000310 A 1/2003

* cited by examiner

*Primary Examiner*—Tung Vo
(74) *Attorney, Agent, or Firm*—Sughrue Mion, PLLC (57) ABSTRACT

A transcoding apparatus and method, and target bit-allocation and picture complexity estimation units and methods used for the same are provided. The transcoding apparatus includes: a video decoding unit which receives a compressed bitstream and performs decoding thereof to output decoded pictures; a complexity estimation unit which estimates complexity of a current picture among the decoded pictures to encode the current picture; a target bit-allocation unit which performs desired bit-allocation using the complexity information of the current picture; a bit-rate control unit which controls bit-rate using bit-allocation information and state information from memory, which outputs an encoded bitstream; and a video encoding unit which encodes the decoded pictures on the basis of the bit-allocation and state information of the bit-rate control unit. Therefore, an effect exists for transcoding that improves image quality.

41 Claims, 8 Drawing Sheets

TRANSCODING APPARATUS AND METHOD, AND TARGET BIT ALLOCATION AND PICTURE COMPLEXITY ESTIMATION APPARATUS AND METHODS USED FOR THE SAME

This application claims priorities from U.S. Patent Application No. 60/430,086, filed on Dec. 2, 2002, in the U.S. Patent and Trademark Office, and from Korean Patent Application No. 2003-8146, filed on Feb. 10, 2003, in the Korean Intellectual Property Office, the disclosures of which are incorporated herein in their entireties by reference.

BACKGROUND OF THE INVENTION

1. Field of the Invention

The present invention relates to transcoding, and more particularly to picture complexity estimation in transcoding, and target bit-allocation for controlling bit-rate during transcoding.

2. Description of the Related Art

Figure 1:
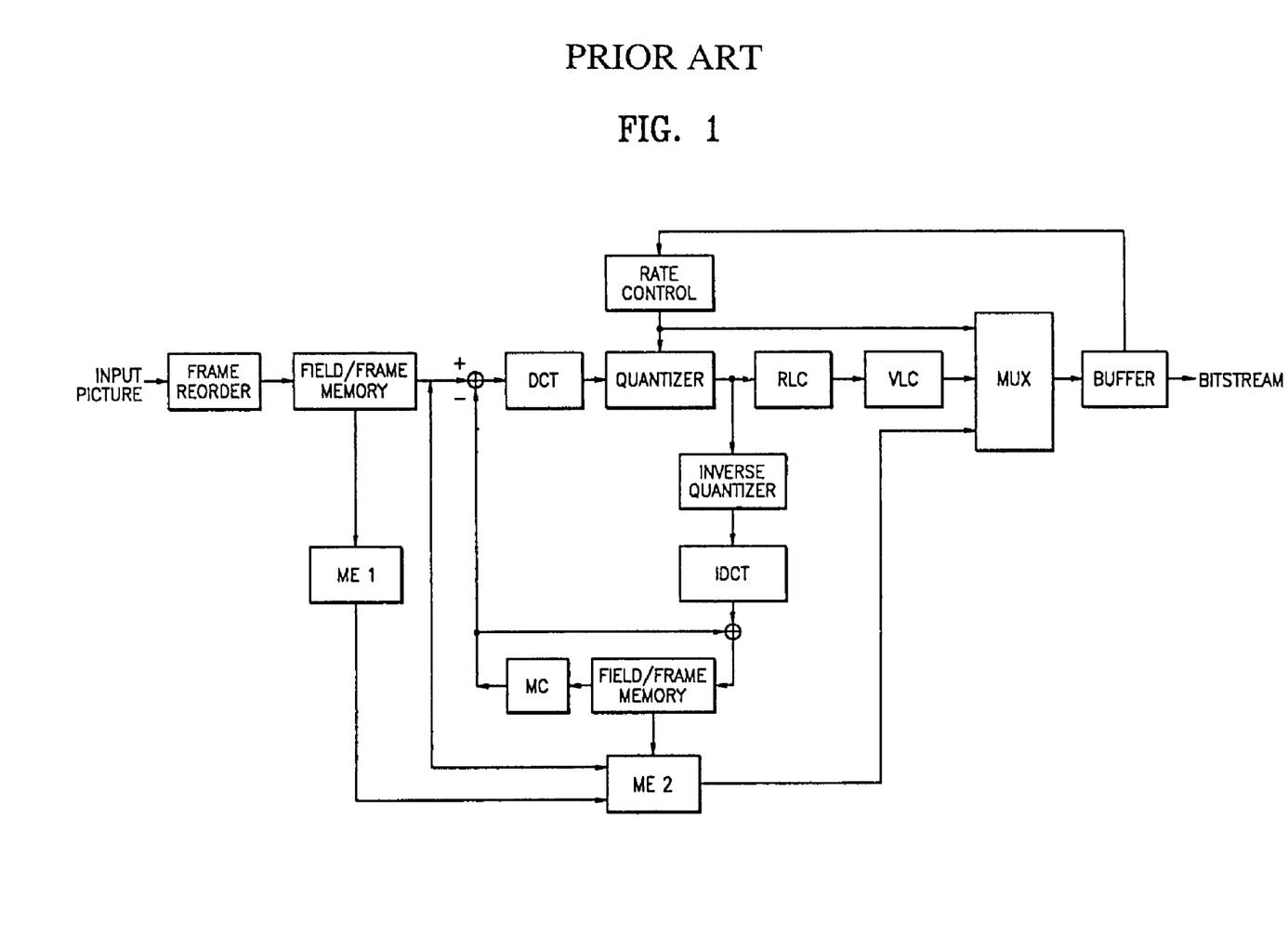
FIG. 1 is a block diagram of an MPEG (motion picture experts group) encoder.

FIG. 1 is a block diagram of an MPEG (Motion Picture Experts Group) encoder.

An MPEG encoder receives images and performs DCT (Discrete Cosine Transformation), quantization, VLC (Variable Length Coding), etc., on the images and outputs an encoded bitstream. Bit-rate control is necessary so as to make the bit-rate of the encoded bitstream constant. Generally, such bit-rate control is performed by a bit-allocation operation which determines the target number of bits to be allocated to one picture to be encoded, and a quantization value determination operation which determines quantization values on the basis of the target number of allocated bits.

For example, if it is assumed that an input image should be encoded at a bit-rate of 3 Mbps, and 30 frames, i.e., 30 pictures per second are provided, 300 kbit are allocated for one picture. This is the result of the bit-allocation operation. Then, quantization is performed. If it is assumed that 300 macroblocks exist in one picture, 1 kbit is allocated for one macroblock. Quantization values used for quantization are determined on the basis of the number of allocated bits. If the number of the allocated bits is large, the quantization value should be small. If the number of the allocated bits is small, the quantization value should be large.

Transcoding is a technique for transforming the predetermined bit-rate or size of an image into another bit-rate or size.

Figure 2:
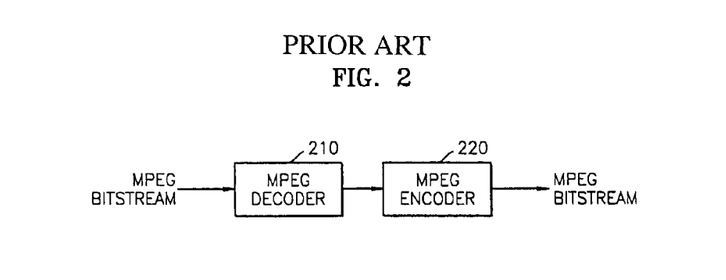
FIG. 2 is a schematic view used for describing a transcoding method for bit-rate transformation.

FIG. 2 is a block diagram used for describing a transcoding method for bit-rate transformation.

To transform the bit-rate of a bitstream coded according to the MPEG standards, an MPEG decoder 210 and an MPEG encoder 220 are required, as shown in FIG. 2. The MPEG decoder 210 receives a bitstream encoded according to the MPEG standards and decodes the bitstream, and the MPEG encoder 220 encodes the decoded image at another bit-rate.

Figure 3:
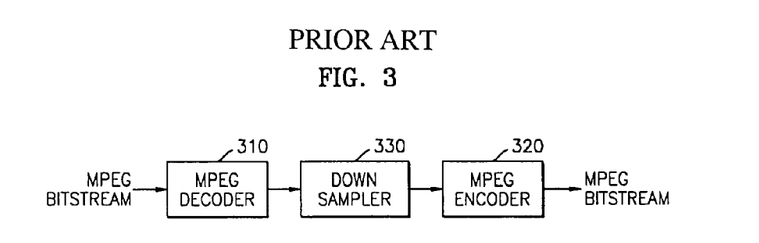
FIG. 3 is a block diagram used for describing a transcoding method for both bit-rate and picture size transformation.

FIG. 3 is a block diagram used for describing a transcoding method for both bit-rate and picture size transformation.

To transform picture size as well as bit-rate, a down sampler 330 is further required, as shown in FIG. 3. The down sampler 330 performs sampling of input picture data to reduce the size of the picture. In this transcoding method, an MPEG encoder 320 is provided to perform bit-rate control. For performing the bit-rate control, the MPEG encoder 320 may use a general bit-rate control method. However, it is more efficient for the MPEG encoder 320 to perform bit-rate control using various additional information output from an MPEG decoder 310.

U.S. Published Patent Application No. 2002-080877 has disclosed a technique for transcoding compressed digital video streams. As described in the above application, a transcoding apparatus includes a decoder, an encoder, and an estimator. The estimator estimates complexities of current and previous decoded pictures. The encoder performs bit-allocation for a current picture in order to maintain image quality of the new reconstructed picture. However, the disclosed conventional technique has low efficiency, because it does not use previous encoded picture information.

SUMMARY OF THE INVENTION

The present invention provides a transcoding apparatus and method, and a picture complexity estimation method and apparatus used for the same. During the transcoding process, complexity calculation on each picture is used to perform bit-allocation for controlling bit-rate. The present invention provides a transcoding apparatus and method, and a picture complexity estimation method and apparatus used for the same, which are capable of improving image quality upon transcoding, by efficiently estimating the complexity of each picture using both complexity information of a decoded picture at a previous time and complexity information of an encoded picture at a previous time.

According to an aspect of the present invention, there is provided a transcoding apparatus comprising: a video decoding unit which receives a compressed bitstream and performs decoding thereof to output decoded pictures; a complexity estimation unit which estimates complexity of a current picture among the decoded pictures to encode the current picture; a target bit-allocation unit which performs desired bit-allocation using the complexity information of the current picture; a bit-rate control unit which controls bit-rate using bit-allocation information and state information from memory, which outputs an encoded bitstream; and a video encoding unit which encodes the decoded pictures on the basis of the bit-allocation and state information of the bit-rate control unit.

According to another aspect of the present invention, there is provided a unit for estimating complexities of pictures, the unit comprising: a decoded picture information receiving unit which receives complexity information of decoded previous and current pictures; an encoded picture information receiving unit which receives complexity information of an encoded previous picture; and a complexity estimation unit, which estimates complexity of a picture to be currently encoded, using the complexity of the decoded previous and current pictures and the complexity of the encoded previous picture.

According to still another aspect of the present invention, there is provided a bit-allocation unit comprising: a complexity estimation unit which receives a compressed bitstream, performs decoding thereof, outputs decoded pictures, and estimates complexity of a current picture among the decoded pictures; and a bit-allocation unit which performs desired bit-allocation using the complexity of the current picture.

According to still yet another aspect of the present invention, there is provided a transcoding method comprising: receiving a compressed bitstream and performing decoding thereof to output decoded pictures; estimating complexity of a current picture among the decoded pictures; performing desired bit-allocation using the complexity of the current picture; controlling bit-rate using bit-allocation information and state information from memory, which outputs encoded bitstream; and encoding the decoded pictures on the basis of the bit-allocation and state information.

According to further another aspect of the present invention, there is provided a method for estimating complexities of pictures, the method comprising: receiving complexity information of decoded previous and current pictures; receiving complexity information of an encoded previous picture; and estimating complexity of a current picture to be encoded, using the complexity information of the decoded previous and current pictures and the complexity information of the encoded previous picture.

According to still further another aspect of the present invention, there is provided a bit-allocation method comprising: receiving a compressed bitstream, performing decoding thereof, outputting decoded pictures, and estimating complexity of a current picture among the decoded pictures; and performing desired bit-allocation using complexity of the current picture.

According to still yet further another aspect of the present invention, there is provided a computer readable medium having embodied thereon a computer program for a transcoding method comprising: receiving a compressed bitstream and performing decoding thereof to output decoded pictures; estimating complexity of a current picture among the decoded pictures; performing desired bit-allocation using the complexity of the current picture; controlling bit-rate using bit-allocation information and state information from memory, which outputs an encoded bitstream; and encoding the decoded pictures on the basis of the bit-allocation and state information.

According to more further another aspect of the present invention, there is provided a computer readable medium having embodied thereon a computer program for a picture complexity estimation method comprising: receiving complexity information of decoded previous and current pictures; receiving complexity information of an encoded previous picture; and estimating complexity of a current picture to be encoded, using the complexity information of the decoded previous and current pictures and the complexity information of the encoded previous picture.

According to still more further another aspect of the present invention, there is provided a computer readable medium having embodied thereon a computer program for a bit-allocation method comprising: receiving a compressed bitstream, performing decoding thereof, outputting decoded pictures, and estimating complexity of a current picture among the decoded pictures; and performing desired bit-allocation using complexity of the current picture.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the appended drawings.

Bit-allocation is required to estimate and pre-allocate the target number of bits required for encoding one picture. For performing bit-allocation, picture complexity should be pre-determined using Equation 1 below.

$$X_I = S_I Q_I, \quad X_P = \frac{S_P Q_P}{K_P}, \quad X_B = \frac{S_B Q_B}{K_B} \quad (1)$$

Wherein, I, P, and B represent an I picture, a P picture, and a B picture, respectively. Also, X represents picture complexity, S represents the number of bits generated for each picture, Q represents an average quantization value for each picture (i.e., the average quantization value is obtained by averaging quantization values of different macroblocks), and K is a constant representing relative complexity difference among the I picture, P picture, and B picture.

Figure 4:
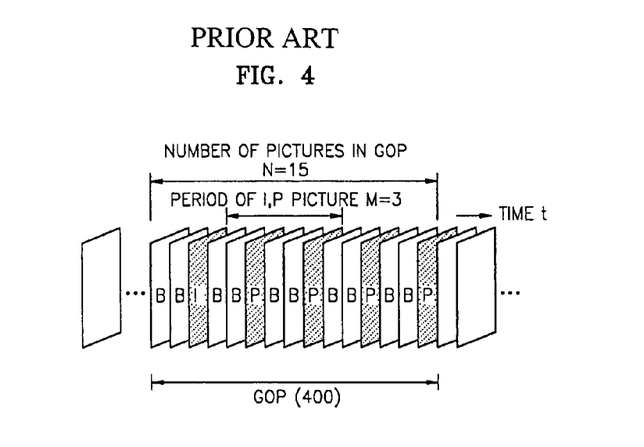
FIG. 4 is a diagram showing the structure of a GOP (group of pictures)

FIG. 4 is a view showing the structure of a GOP (group of pictures).

GOP 400 is a group of successive pictures beginning with an I picture. The I picture is a picture compressed in JPEG (Joint Photographic Coding Experts Group) format, the P picture is a picture subjected to forward estimation, and the B picture is a picture subjected to forward, backward, and interpolation estimations. MPEG (Motion Picture Experts Group) video consists of these three types of pictures arranged with a constant pattern. An I picture can be generated at any location of a bitstream, and is used for access of a bitstream. The I picture is also encoded without reference to other pictures. The I picture is generally compressed using the JPEG format. The I picture can be compressed in real-time using the MPEG format. The I picture has the lowest compression ratio, when compressed, in the MPEG format. Then, the I picture consists of macroblocks, each of which is an 8*8 block, and is successively subjected to DCT (Discrete Cosine Transformation). During DCT, coefficients are encoded by a DPCM (Differential Pulse Code Modulation) method, which obtains a difference value of the DCT coefficients from successive macroblocks and transforms the difference value using VLC (Variable Length Coding).

A P picture is generated using the previous I picture and previous P picture during encoding/decoding. In most cases, when any one object on successive pictures is moved, image blocks of the object are moved in different directions without change of object shape. In this regard, the P picture is generated by encoding only difference values between a previous picture and a current picture, considering that the difference between the previous picture and the current picture is very small.

A B picture is generated using the previous and current I and P pictures during encoding/decoding. A high compression rate can be obtained through using the B picture. A B picture has a difference value between the previous I picture or P picture and an I picture or P picture following the B picture.

Figure 5:
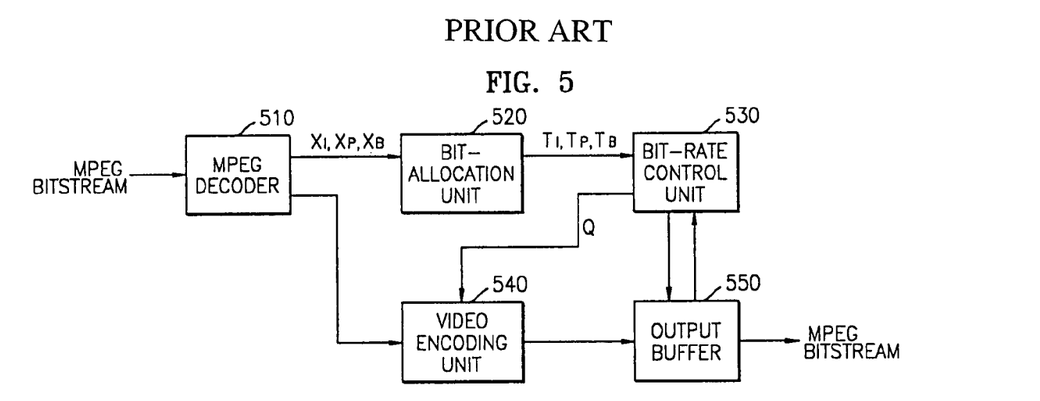
FIG. 5 is a block diagram describing a conventional bit-rate control method used in transcoding.

FIG. 5 is a block diagram describing a conventional bit-rate control method used in transcoding.

A target bit-allocation unit 520 receives $X_I$, $X_P$, and $X_B$ values for each picture output from an MPEG decoder 510, calculates the target bit values $T_I$, $T_P$, and $T_B$ for each picture, and transfers these values to a bit-rate control unit. The $X_I$, $X_P$, and $X_B$ values represent complexity of an I picture, complexity of a P picture, and complexity of a B picture, respectively. The $T_I$, $T_P$, and $T_B$ values represent the number of target bits for the I picture, P picture, and B picture, respectively. The $T_I$, $T_P$, and $T_B$ values are calculated using Equations 2 below. A bit-rate control unit 530 receives these values, calculates quantization values thereof, and transfers the quantization values to a video encoding unit 540. The video encoding unit 540 uses the quantization values to perform quantization and encoding, and then transfers the encoded bitstream to an output buffer 550.

$$T_I = \frac{X_I}{X_I + \sum_{i=1}^{N_P} X_P + \sum_{j=1}^{N_B} X_B} \times T_{GOP} \quad (2)$$

$$T_P = \frac{X_P}{\sum_{i=1}^{N_P} X_P + \sum_{j=1}^{N_B} X_B} \times (T_{GOP} - S)$$

$$T_B = \frac{X_B}{\sum_{i=1}^{N_P} X_P + \sum_{j=1}^{N_B} X_B} \times (T_{GOP} - S)$$

$T_{GOP}$ represents the number of bits allocated to each GOP according to the number of target bits. Also, S represents the number of bits for all pictures generated from a first picture to a current picture in one GOP. $N_P$ and $N_B$ represent the numbers of P and B pictures in the GOP currently remaining to be encoded, respectively. Accordingly, each denominator in the above Equations is the sum of complexities for each of the pictures in one GOP remaining to be encoded. $T_{GOP}$–S represents the number of bits currently in one GOP remaining.

A decoded picture and a picture to be encoded represent images at a same time. If a complexity value X of the input bitstream is used as a complexity value of the output bitstream, bit-rates can not be efficiently controlled. This is because bit-rate of the input bitstream and bit-rate of the output bitstream are different from each other. Also, when the image size is reduced in transcoding, it becomes more difficult to match the complexity value X of the input bitstream with the complexity value of the output bitstream.

Figure 6:
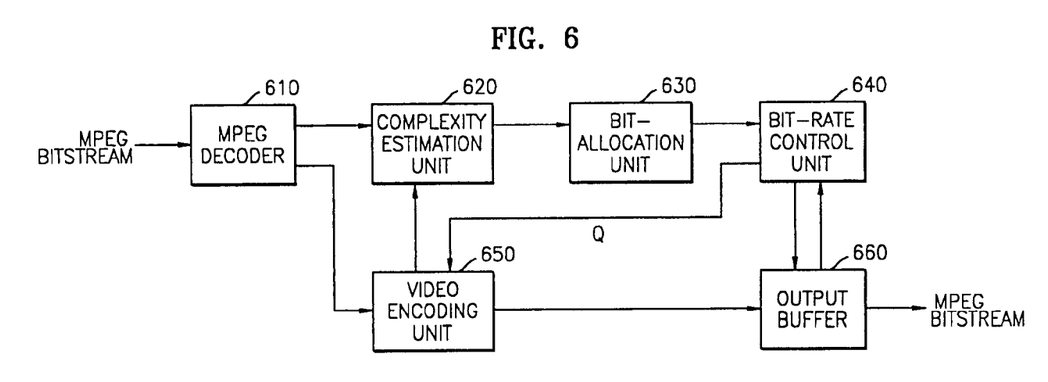
FIG. 6 is a block diagram showing the construction of a transcoding apparatus, according to the present invention.

FIG. 6 is a block diagram showing the construction of a transcoding apparatus, according to the present invention.

The transcoding apparatus includes an MPEG decoder 610, a complexity estimator 620, a target bit-allocation unit 630, a bit-rate control unit 640, a video encoding unit 650, and an output buffer 660.

The MPEG decoder 610 receives a compressed bitstream, according to the MPEG standard and performs decoding thereof.

The complexity estimator 620 estimates complexity for each picture using information decoded by the MPEG decoder 610 and encoded information at a previous time. The complexity for each picture is calculated using Equation 3 below.

$$\hat{X}_{out,I} = \frac{X'_{out,I}}{X'_{in,I}} \times X_{in,I} \quad (3)$$

$$\hat{X}_{out,P} = \frac{X'_{out,P}}{X'_{in,P}} \times X_{in,P}$$

$$\hat{X}_{out,B} = \frac{X'_{out,B}}{X'_{in,B}} \times X_{in,B}$$

$\hat{X}_{out}$ denotes the estimated picture complexity of a decoded picture before encoding, and is used to determine the number of target bits. $X_{in}$ denotes the complexity of a decoded current picture, $X'_{in}$ denotes the complexity of a decoded previous picture, and $X'_{out}$ denotes the complexity of a previous picture after encoding.

Figure 7A:
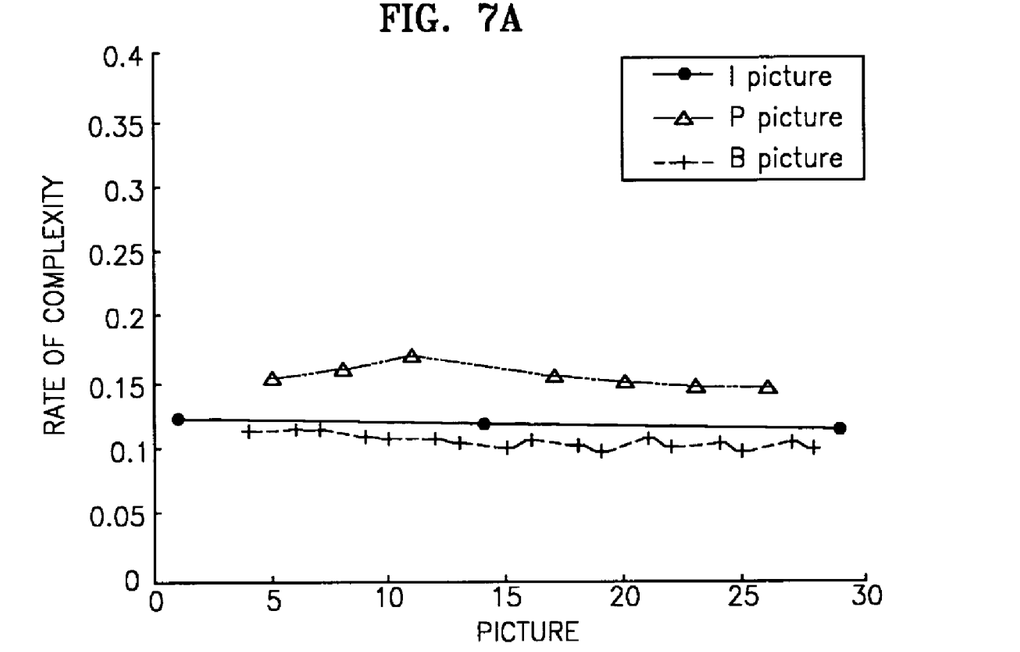
FIGS. 7A and 7B are graphs showing complexity ratios of encoded previous pictures to decoded previous pictures with respect to picture numbers according to the MPEG standards, respectively.
Figure 7B:
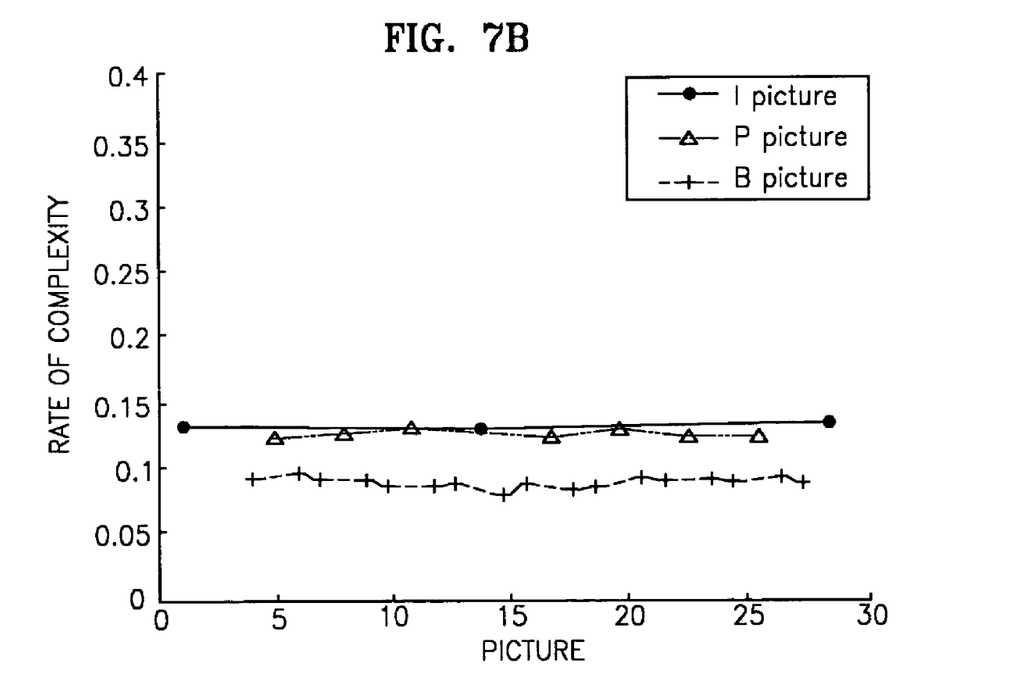

FIGS. 7A and 7B are graphs showing complexity ratios of encoded previous pictures to decoded previous pictures with respect to picture number according to the MPEG standards, respectively.

FIG. 7A illustrates a complexity ratio of the encoded previous picture to the decoded previous picture when transcoding input video from a bit-rate of 20 Mbps to 4 Mbps, and FIG. 7B illustrates a complexity ratio of the decoded previous picture to the encoded previous picture when transcoding input video from a bit-rate of 20 Mbps to 2 Mbps. With reference to FIGS. 7A and 7B, the complexity ratio of the encoded picture to the decoded picture at the previous time has a constant characteristic over time.

The target bit-allocation unit 630 performs bit-allocation using the calculated complexity of a current picture. That is, complexity of a picture to be currently encoded is calculated through Equation 3 above using the complexities of the decoded previous and current pictures and the complexity of the encoded previous picture. Then, bit-allocation for an I picture is performed using Equation 4 below. Likewise, bit-allocations for P and B pictures are also performed using Equation 5 and Equation 6 below.

$$T_I = \frac{\hat{X}_{out,I}}{\hat{X}_{out,I} + \sum_{i=1}^{N_P} \hat{X}_{out,P}[i] + \sum_{j=1}^{N_B} \hat{X}_{out,B}[j]} \times T_{GOP} \quad (4)$$

$$= \frac{X_{in,I} \times \omega_I}{X_{in,I} \times \omega_I + \sum_{i=1}^{N_P} X_{in,P}[i] \times \omega_P + \sum_{j=1}^{N_B} X_{in,B}[j] \times \omega_B} \times T_{GOP}$$

$$\omega_I = \frac{X'_{out,I}}{X'_{in,I}}, \omega_P = \frac{X'_{out,P}}{X'_{in,P}}, \omega_B = \frac{X'_{out,B}}{X'_{in,B}}$$

$$T_P = \frac{\hat{X}_{out,P}}{\hat{X}_{out,I} + \sum_{i=1}^{N_P} \hat{X}_{out,P}[i] + \sum_{j=1}^{N_B} \hat{X}_{out,B}[j]} \times T_{GOP} \quad (5)$$

$$= \frac{X_{in,P} \times \omega_P}{X_{in,I} \times \omega_I + \sum_{i=1}^{N_P} X_{in,P}[i] \times \omega_P + \sum_{j=1}^{N_B} X_{in,B}[j] \times \omega_B} \times T_{GOP}$$

$$\omega_I = \frac{X'_{out,I}}{X'_{in,I}}, \omega_P = \frac{X'_{out,P}}{X'_{in,P}}, \omega_B = \frac{X'_{out,B}}{X'_{in,B}}$$

-continued $$T_B = \frac{\hat{X}_{out,B}}{\hat{X}_{out,I} + \sum_{i=1}^{N_P} \hat{X}_{out,P}[i] + \sum_{j=1}^{N_B} \hat{X}_{out,B}[j]} \times T_{GOP} \qquad (6)$$

$$= \frac{X_{in,B} \times \omega_B}{X_{in,I} \times \omega_I + \sum_{i=1}^{N_P} X_{in,P}[i] \times \omega_P + \sum_{j=1}^{N_B} X_{in,B}[j] \times \omega_B} \times T_{GOP}$$

$$\omega_I = \frac{X'_{out,I}}{X'_{in,I}}, \quad \omega_P = \frac{X'_{out,P}}{X'_{in,P}}, \quad \omega_B = \frac{X'_{out,B}}{X'_{in,B}}$$

The bit-rate control unit 640 controls bit-rate using the bit-allocation information and state information of an output buffer, which outputs the encoded bitstream. The video encoding unit 650 encodes the decoded pictures based on the control information of the bit-rate control unit 640. The output buffer stores the bitstream generated by the video encoding unit 650 and outputs the bitstream according to a desired bit-rate.

Figure 8:
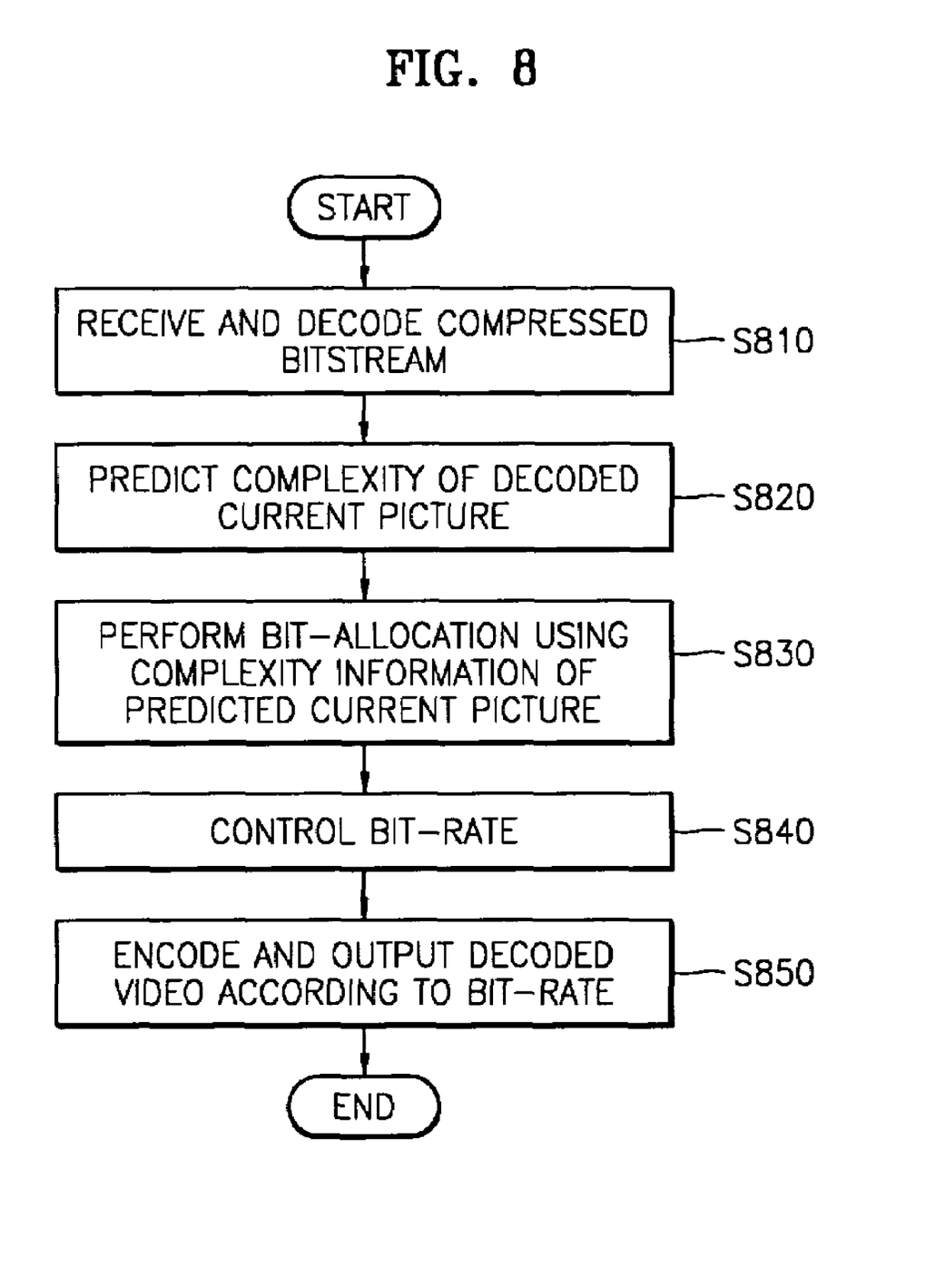
FIG. 8 is a flow chart illustrating a transcoding method according to the present invention.

FIG. 8 is a flow chart illustrating a transcoding method according to the present invention.

First, the compressed bitstream of a current picture is input and decoded (step S810). The compressed bitstream may be compressed in an MPEG format. Then, the complexity of the decoded current picture is estimated in order to encode the decoded current picture (step S820). That is, complexity of a picture to be currently encoded is calculated using the complexity information of the decoded previous and current pictures and the complexity information of the encoded previous picture. The complexity of the picture is calculated using Equation 3 above.

Successively, bit-allocation is performed using the complexity information of the current picture calculated by Equation 3 (step S830). If the calculated complexity of the current picture is large, the number of bits to be allocated to the picture is increased, and if the calculated complexity of the current picture is small, the number of bits to be allocated to the picture is decreased, wherein, the number of bits allocated to the picture is calculated using the above Equation 4. Then, bit-allocation information and state information of an output buffer, which outputs the encoded bitstream, is used for bit-rate control (step S840). The decoded pictures are encoded and output on the basis of the control information of the bit rate control unit (step S850).

Figure 9A:
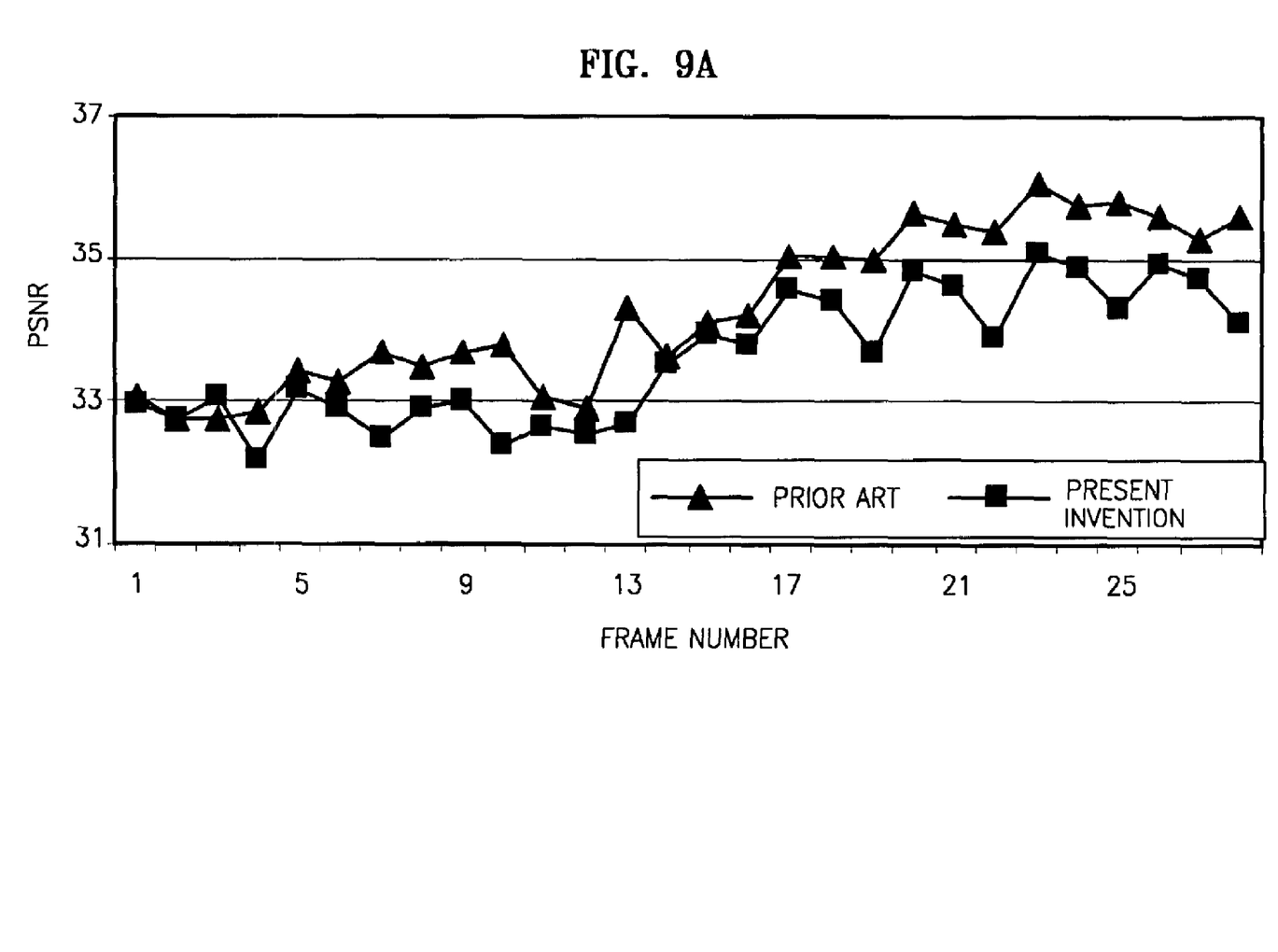
FIGS. 9A through 9C are graphs showing image quality variations with respect to frame numbers comparing a transcoding technique according to the present invention to the conventional technique.
Figure 9B:
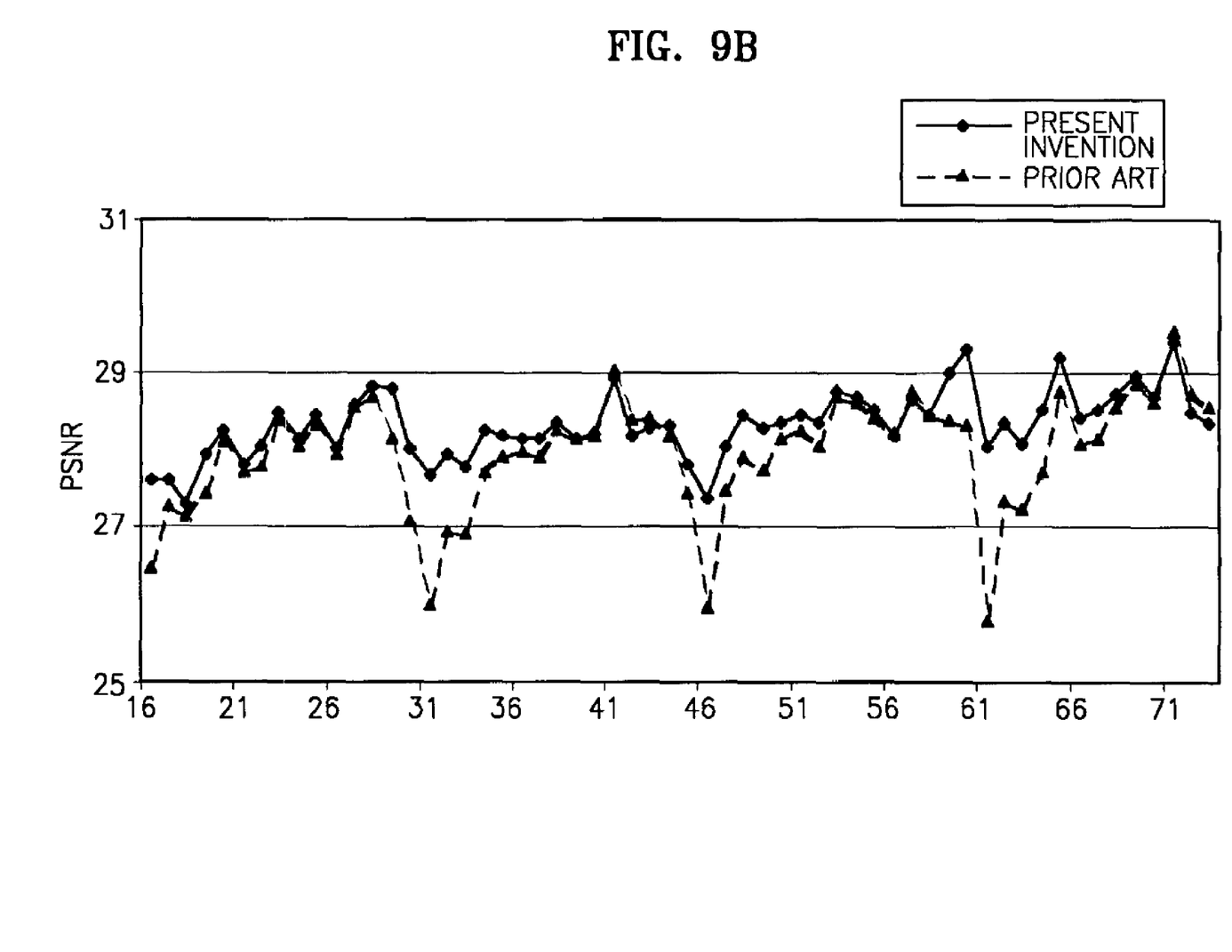
Figure 9C:
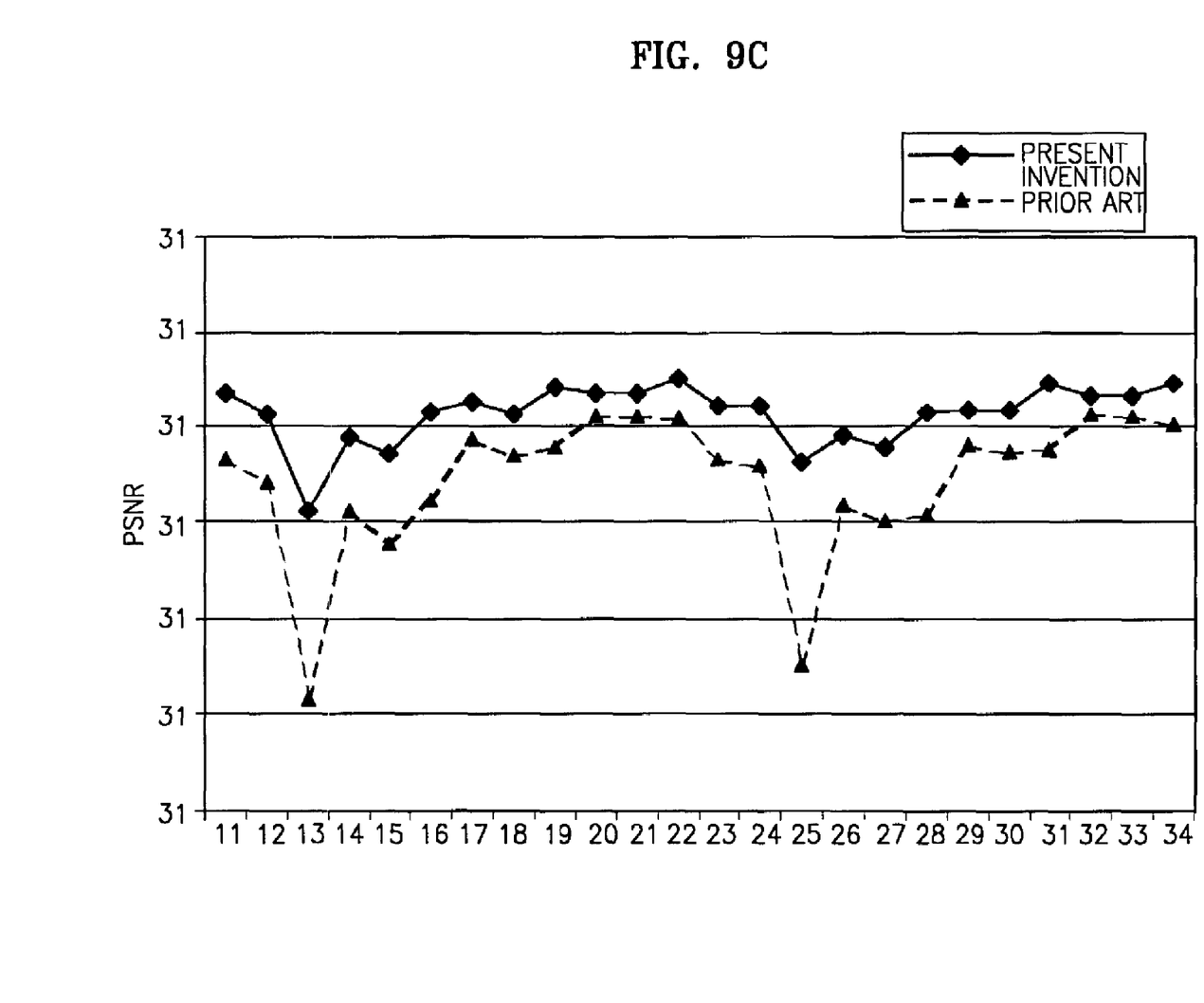

FIGS. 9A through 9C are graphs showing image quality variations with respect to frame numbers, comparing a transcoding method according to the present invention to the conventional technique.

FIG. 9A is a graph illustrating image quality variation with respect to frame numbers when transforming from a bit-rate of 20 Mbps to a bit-rate of 4 Mbps in a "basketball" image according to the MPEG standards. FIG. 9B is a graph illustrating image quality variation with respect to the frame numbers when transforming from a bit-rate of 10 Mbps to a bit-rate of 4 Mbps in a "flower" image according to the MPEG standards. FIG. 9C is a graph illustrating image quality variation with respect to the frame numbers when transforming from a bit-rate of 10 Mbps to a bit-rate of 4 Mbps in a "mobile calendar" image according to the MPEG standards. Referring to FIGS. 9A through 9C, an excellent image quality is obtained, when compared with the method disclosed in the above-mentioned U.S. Published Patent Application No. 2002-080877.

According to the present invention, when allocating target bits for bit-rate control during transcoding, efficient picture complexity estimations are possible, by estimating picture complexity using complexity information of decoded pictures at current and previous times, and complexity information of an encoded picture at a previous time. Accordingly, bit-allocation and bit-rate control of a transcoding apparatus are efficiently performed, thereby further improving image quality in the transcoding.

The present invention may be embodied in a general purpose digital computer by running a program from a computer readable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). The present invention may be embodied as a computer readable medium having a computer readable program code unit embodied therein for causing a number of computer systems connected via a network to affect distributed processing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A transcoding apparatus comprising:
    a video decoding unit which receives compressed bitstream and performs decoding thereof to output decoded pictures;
    a complexity estimation unit which estimates complexity of a current picture among the decoded pictures to encode the current picture;
    a target bit-allocation unit which performs desired bit-allocation using the complexity information of the current picture;
    a bit-rate control unit which controls bit-rate using bit-allocation information and state information from memory, which outputs an encoded bitstream; and
    a video encoding unit which encodes the decoded pictures on the basis of the bit-allocation and state information of the bit-rate control unit,
    wherein the complexity estimation unit calculates complexity of a picture to be currently encoded, using complexity of decoded previous and current pictures output from the video decoding unit and complexity of an encoded previous picture output from the video encoding unit.

2. The transcoding apparatus of claim 1, further comprising an output buffer which stores and outputs pictures encoded by the video encoding unit, wherein state information of the output buffer is provided to the bit-rate control unit.

3. The transcoding apparatus of claim 1, wherein the compressed bitstream input to the video decoding unit is compressed in MPEG (Motion Picture Experts Group) format.

4. The transcoding apparatus of claim 1, wherein if it is assumed that $\hat{X}_{out,I}$ represents complexity of a current I picture to be encoded, $\hat{X}_{out,P}$ represents complexity of a current P picture to be encoded, and $\hat{X}_{out,B}$ represents complexity of a current B picture to be encoded, the complexity estimation unit calculates $\hat{X}_{out,I}$, $\hat{X}_{out,P}$, and $\hat{X}_{out,B}$, respectively, as follows:

$$\hat{X}_{out,I} = \frac{X'_{out,I}}{X'_{in,I}} \times X_{in,I}$$

$$\hat{X}_{out,P} = \frac{X'_{out,P}}{X'_{in,P}} \times X_{in,P}$$

$$\hat{X}_{out,B} = \frac{X'_{out,B}}{X'_{in,B}} \times X_{in,B},$$

wherein, $X'_{out,I}$, $X'_{out,P}$, and $X'_{out,B}$ denote complexities of encoded previous pictures of the current I, P, and B pictures, respectively, $X'_{in,I}$, $X'_{in,P}$, and $X'_{in,P}$ denote complexities of decoded previous pictures of the current I, P, and B pictures, respectively, and $X_{in,I}$, $X_{in,P}$, and $X_{in,B}$ denote complexities of decoded current I, P, and B pictures, respectively.

5. The transcoding apparatus of claim 1, wherein the bit-allocation unit increases a number of bits to be allocated for the current picture if complexity of an estimated current picture is large, and decreases number of bits to be allocated for the current picture if the complexity of the estimated current picture is small.

6. The transcoding apparatus of claim 1, wherein the target bit-allocation unit calculates a number of bits to be allocated for the current picture using the complexity of the current picture.

7. The transcoding apparatus of claim 1, wherein the bit-allocation unit calculates a number of bits $T_I$ to be allocated for a current I picture, using the complexity of the current picture, as follows:

$$T_I = \frac{\hat{X}_{out,I}}{\hat{X}_{out,I} + \sum_{i=1}^{N_P} \hat{X}_{out,P}[i] + \sum_{j=1}^{N_B} \hat{X}_{out,B}[j]} \times T_{GOP},$$

wherein, $\hat{X}_{out}$ denotes complexity of a picture to be currently encoded, $N_P$ denotes a number of P pictures in a GOP (group of pictures), and $N_B$ denotes a number of B pictures in the GOP.

8. An unit for estimating complexities of pictures, the unit comprising:
a decoded picture information receiving unit which receives complexity information of decoded previous and current pictures;
an encoded picture information receiving unit which receives complexity information of an encoded previous picture generated by encoding the decoded previous picture; and
a complexity estimation unit, which estimates complexity of a picture to be currently encoded, using the complexity of the decoded previous and current pictures and the complexity of the encoded previous picture.

9. The estimating unit of claim 8, wherein the encoded picture is compressed in MPEG format.

10. The estimating unit of claim 8, wherein if it is assumed that $\hat{X}_{out,I}$ represents complexity of a current I picture to be encoded, $\hat{X}_{out,P}$ represents complexity of a current P picture to be encoded, and $\hat{X}_{out,B}$ represents complexity of a current B picture to be encoded, the complexity estimation unit calculates $\hat{X}_{out,I}$, $\hat{X}_{out,P}$, and $\hat{X}_{out,B}$, respectively, as follows:

$$\hat{X}_{out,I} = \frac{X'_{out,I}}{X'_{in,I}} \times X_{in,I}$$

$$\hat{X}_{out,P} = \frac{X'_{out,P}}{X'_{in,P}} \times X_{in,P}$$

$$\hat{X}_{out,B} = \frac{X'_{out,B}}{X'_{in,B}} \times X_{in,B},$$

wherein, $X'_{out,I}$, $X'_{out,P}$, and $X'_{out,B}$ denote complexities of encoded previous pictures of the current I, P, and B pictures, respectively, $X'_{in,I}$, $X'_{in,P}$, and $X_{in,P}$ denote complexities of decoded previous pictures of the current I, P, and B pictures, respectively, and $X_{in,I}$, $X_{in,P}$, and $X_{in,B}$ denote complexities of decoded current I, P, and B pictures, respectively.

11. A bit-allocation unit comprising:
a complexity estimation unit which receives a compressed bitstream, performs decoding thereof, outputs decoded pictures, and estimates complexity of a current picture among the decoded pictures; and
a bit-allocation unit which performs desired bit-allocation using the complexity of the current picture,
wherein the complexity estimation unit calculates complexity of a picture to be currently encoded, using complexity of a decoded previous and current pictures and complexity of an encoded previous picture generated by encoding one of the output decoded pictures.

12. The bit-allocation unit of claim 11, wherein the compressed bitstream is compressed in MPEG format.

13. The bit-allocation unit of claim 11, wherein if it is assumed that $\hat{X}_{out,I}$ represents complexity of a current I picture to be encoded, $\hat{X}_{out,P}$ represents complexity of a current P picture to be encoded, and $\hat{X}_{out,B}$ represents complexity of a current B picture to be encoded, the complexity estimation unit calculates $\hat{X}_{out,I}$, $\hat{X}_{out,P}$, and $\hat{X}_{out,B}$, respectively, as follows:

$$\hat{X}_{out,I} = \frac{X'_{out,I}}{X'_{in,I}} \times X_{in,I}$$

$$\hat{X}_{out,P} = \frac{X'_{out,P}}{X'_{in,P}} \times X_{in,P}$$

$$\hat{X}_{out,B} = \frac{X'_{out,B}}{X'_{in,B}} \times X_{in,B},$$

wherein, $X'_{in,I}$, $X'_{in,P}$, and $X'_{out,B}$ denote complexities of encoded previous pictures of the current I, P, and B pictures, respectively, $X'_{in,I}$, $X'_{in,P}$, and $X'_{out,P}$ denote complexities of decoded previous pictures of the current I, P, and B pictures, respectively, and $X_{in,I}$, $X_{in,P}$, and $X_{in,B}$ denote complexities of decoded current I, P, and B pictures, respectively.

14. The bit-allocation unit of claim 11, wherein the target bit-allocation unit calculates a number of bits $T_I$ to be allocated to a current I picture, using the complexity of the current picture, as follows:

$$T_I = \frac{\hat{X}_{out,I}}{\hat{X}_{out,I} + \sum_{i=1}^{N_P} \hat{X}_{out,P}[i] + \sum_{j=1}^{N_B} \hat{X}_{out,B}[j]} \times T_{GOP},$$

wherein, $\hat{X}_{out}$ denotes complexity of a picture to be currently encoded, $N_P$ denotes a number of P pictures in a GOP (group of pictures), and $N_B$ denotes a number of B pictures in the GOP.

15. A bit-allocation method comprising:
receiving a compressed bitstream, performing decoding thereof, outputting decoded pictures, and estimating complexity of a current picture among the decoded pictures; and
performing desired bit-allocation using the complexity information of the current picture,
wherein in estimating the complexity of the current picture, complexity of a picture to be currently encoded is calculated using complexity of decoded previous and current pictures and complexity of an encoded previous picture generated by encoding one of the outputted decoded pictures.

16. The bit-allocation method of claim 15, wherein the compressed bitstream is compressed in MPEG format.

17. The bit-allocation method of claim 15, wherein in estimating the complexity of the current picture, if it is assumed that $\hat{X}_{out,I}$ represents complexity of a current I picture to be encoded, $\hat{X}_{out,P}$ represents complexity of a current P picture to be encoded, and $\hat{X}_{out,B}$ represents complexity of a current B picture to be encoded, $\hat{X}_{out,I}$, $\hat{X}_{out,P}$, and $\hat{X}_{out,B}$ are calculated, respectively, as follows:

$$\hat{X}_{out,I} = \frac{X'_{out,I}}{X'_{in,I}} \times X_{in,I}$$

$$\hat{X}_{out,P} = \frac{X'_{out,P}}{X'_{in,P}} \times X_{in,P}$$

$$\hat{X}_{out,B} = \frac{X'_{out,B}}{X'_{in,B}} \times X_{in,B},$$

wherein, $X'_{in,I}$, $X'_{in,P}$, and $X'_{out,B}$ denote complexities of encoded previous pictures of the current I, P, and B pictures, respectively, $X'_{in,I}$, $X'_{in,P}$, and $X'_{in,P}$ denote complexites of decoded previous pictures of the current I, P, and B pictures, respectively, and $X_{in,I}$, $X_{in,P}$, and $X_{in,B}$ denote complexities of decoded current I, P, and B pictures, respectively.

18. The bit-allocation method of claim 15, wherein in performing the desired bit-allocation, a number of bits to be allocated to a current I picture is calculated, using the complexity of the current picture, as follows:

$$T_I = \frac{\hat{X}_{out,I}}{\hat{X}_{out,I} + \sum_{i=1}^{N_P} \hat{X}_{out,P}[i] + \sum_{j=1}^{N_B} \hat{X}_{out,B}[j]} \times T_{GOP},$$

wherein, $\hat{X}_{out}$ denotes complexity of a picture to be currently encoded, $N_P$ denotes a number of P pictures in a GOP (group of pictures), and $N_B$ denotes a number of B pictures in the GOP.

19. A transcoding method comprising:
receiving a compressed bitstream and performing decoding thereof to output decoded pictures;
estimating complexity of a current picture among the decoded pictures;
performing desired bit-allocation using the complexity of the current picture;
controlling bit-rate using bit-allocation information and state information from memory, which outputs encoded bitstream; and
encoding the decoded pictures on the basis of the bit-allocation and state information,
wherein in estimating the complexity of the current picture, complexity of a picture to be currently encoded is calculated, using complexity of a decoded previous and current pictures, and complexity of an encoded previous picture.

20. The transcoding method of claim 19, wherein the compressed bitstream is compressed in MPEG format.

21. The transcoding method of claim 19, wherein in estimating the complexity of the current picture, if it is assumed that $\hat{X}_{out,I}$ represents complexity of a current I picture to be encoded, $\hat{X}_{out,P}$ represents complexity of a current P picture to be encoded, and $\hat{X}_{out,B}$ represents complexity of a current B picture to be encoded, $\hat{X}_{out,I}$, $\hat{X}_{out,P}$, and $\hat{X}_{out,B}$, are calculated respectively, as follows:

$$\hat{X}_{out,I} = \frac{X'_{out,I}}{X'_{in,I}} \times X_{in,I}$$

$$\hat{X}_{out,P} = \frac{X'_{out,P}}{X'_{in,P}} \times X_{in,P}$$

$$\hat{X}_{out,B} = \frac{X'_{out,B}}{X'_{in,B}} \times X_{in,B},$$

wherein, $X'_{out,I}$, $X'_{out,P}$, and $X'_{out,B}$ denote complexities of encoded previous pictures of the current I, P, and B pictures, respectively, $X'_{in,I}$, $X'_{in,P}$, and $X'_{in,P}$ denote complexities of decoded previous pictures of the current I, P, and B pictures, respectively, and $X_{in,I}$, $X_{in,P}$, and $X_{in,B}$ denote complexities of decoded current I, P, and B pictures, respectively.

22. The transcoding method of claim 19, wherein in performing the desired bit-allocation, a number of bits to be allocated to the current picture is increased if the complexity of the current picture is large, and the number of bits to be allocated to the current picture is decreased if the complexity of the current picture is small.

23. The transcoding method of claim 19, wherein in performing the desired bit-allocation, a number of bits to be allocated to the current picture is estimated using the complexity of the current picture.

24. The transcoding method of claim 19, wherein in performing the desired bit-allocation, a number of bits $T_I$ to be allocated to a current I picture is calculated, using the complexity of the current picture, as follows:

$$T_I = \frac{\hat{X}_{out,I}}{\hat{X}_{out,I} + \sum_{i=1}^{N_P} \hat{X}_{out,P}[i] + \sum_{j=1}^{N_B} \hat{X}_{out,B}[j]} \times T_{GOP},$$

wherein, $\hat{X}_{out}$ denotes complexity of a picture to be currently encoded, $N_P$ denotes a number of P pictures in a GOP (group of pictures), and $N_B$ denotes a number of B pictures in the GOP.

25. A method for estimating complexities of pictures, the method comprising:
   receiving complexity information of decoded previous and current pictures;
   receiving complexity information of an encoded previous picture; and
   estimating complexity of a current picture to be encoded, using the complexity information of the decoded previous and current pictures and the complexity information of the encoded previous picture, the encoded previous picture being generated by encoding the decoded previous picture.

26. The complexity estimating method of claim 25, wherein the encoded picture is compressed in MPEG format.

27. The complexity estimating method of claim 25, wherein in estimating the complexity of the current picture, if it is assumed that $\hat{X}_{out,I}$ represents complexity of a current I picture to be encoded, $\hat{X}_{out,P}$ represents complexity of a current P picture to be encoded, and $\hat{X}_{out,P}$ represents complexity of a current B picture to be encoded, $\hat{X}_{out,B}$, $\hat{X}_{out,I}$, and $\hat{X}_{out,B}$, are calculated respectively, as follows:

$$\hat{X}_{out,I} = \frac{X'_{out,I}}{X'_{in,I}} \times X_{in,I}$$

$$\hat{X}_{out,P} = \frac{X'_{out,P}}{X'_{in,P}} \times X_{in,P}$$

$$\hat{X}_{out,B} = \frac{X'_{out,B}}{X'_{in,B}} \times X_{in,B},$$

wherein, $X'_{out,I}$, $X'_{out,P}$, and $X'_{out,B}$ denote complexities of encoded previous pictures of the current I, P, and B pictures, respectively, $X'_{in,I}$, $X'_{in,P}$, and $X'_{in,P}$ denote complexities of decoded previous pictures of the current I, P, and B pictures, respectively, and $X_{in,I}$, $X_{in,P}$, and $X_{in,B}$ denote complexities of decoded current I, P, and B pictures, respectively.

28. A computer readable medium having embodied thereon a computer program for enabling a computer to execute a transcoding method, the method comprising:
   receiving a compressed bitstream and performing decoding thereof to output decoded pictures;
   estimating complexity of a current picture among the decoded pictures using a complexity information of a decoded previous picture, a complexity information of decoded current picture and a complexity information of an encoded previous picture generated by encoding one of the outputted decoded pictures;
   performing desired bit-allocation using the complexity of the current picture;
   controlling bit-rate using bit-allocation information and state information from memory, which outputs an encoded bitstream; and
   encoding the decoded pictures on the basis of the bit-allocation and state information.

29. A computer readable medium having embodied thereon a computer program for enabling a computer to execute a picture complexity estimation method, the method comprising:
   receiving complexity information of decoded previous and current pictures;
   receiving complexity information of an encoded previous picture; and
   estimating complexity of a current picture to be encoded, using the complexity information of the decoded previous and current pictures and the complexity information of the encoded previous picture generated by encoding the decoded previous picture.

30. A computer readable medium having embodied thereon a computer program for enabling a computer to execute a bit-allocation method, the method comprising:
   receiving a compressed bitstream, performing decoding thereof, outputting decoded pictures;
   estimating complexity of a current picture among the decoded pictures using a complexity information of a decoded previous picture, a complexity information of a decoded current picture and a complexity information of an encoded previous picture generated by encoding the decoded previous picture; and
   performing desired bit-allocation using complexity of the current picture.

31. The transcoding apparatus of claim 1 wherein the complexity estimation unit calculates the complexity of the current picture using information decoded by the video decoding unit and encoded information at a previous time.

32. The transcoding method of claim 19, wherein the complexity of the current picture among the decoded pictures is estimated by calculating the complexity of the current picture using information obtained by decoding the compressed bitstream and encoded information at a previous time.

33. The transcoding apparatus of claim 1, wherein the complexity estimation unit estimates the complexity of the current picture based on a product of the complexity of the decoded current picture and a ratio of the complexity of the encoded previous picture of the current picture to the complexity of the decoded previous picture of the current picture.

34. The estimating unit of claim 8, wherein the complexity estimation unit estimates the complexity of the current picture based on a product of the complexity of the decoded current picture and a ratio of the complexity of the encoded previous picture of the current picture to the complexity of the decoded previous picture of the current picture.

35. The bit-allocation unit of claim 11, wherein the complexity estimation unit estimates the complexity of the current picture based on a product of the complexity of the decoded current picture and a ratio of the complexity of the encoded previous picture of the current picture to the complexity of the decoded previous picture of the current picture.

36. The bit-allocation method of claim 15, wherein the estimating the complexity of the current picture comprises determining the complexity of the current picture based on a product of the complexity of the decoded current picture and a ratio of the complexity of the encoded previous picture of the current picture to the complexity of the decoded previous picture of the current picture.

37. The transcoding method of claim 19, wherein the estimating complexity of the current pictures comprises determining the complexity of the current picture based on a product of the complexity of the decoded current picture and a ratio of the complexity of the encoded previous picture of the current picture to the complexity of the decoded previous picture of the current picture.

38. The complexity estimating method of claim 25, wherein the estimating the complexity of the current picture to be encoded comprises determining the complexity of the current picture based on a product of the complexity information of the decoded current picture and a ratio of the complexity information of the encoded previous picture to the complexity information of the decoded previous picture.

39. The computer readable medium of claim 28, wherein the estimating the complexity of the current picture comprises determining the complexity of the current picture based on a product of the complexity of the decoded current picture and a ratio of the complexity of the encoded previous picture of the current picture to the complexity of the decoded previous picture of the current picture.

40. The computer readable medium of claim 29, wherein the estimating the complexity of the current picture to be encoded comprises determining the complexity of the current picture based on a product of the complexity information of the decoded current picture and a ratio of the complexity information of the encoded previous picture to the complexity information of the decoded previous picture.

41. The computer readable medium of claim 30, wherein the estimating the complexity of the current picture comprises determining the complexity of the current picture based on a product of the complexity of the decoded current picture and a ratio of the complexity of the encoded previous picture of the current picture to the complexity of the decoded previous picture of the current picture.

* * * * *